(12) United States Patent
Ibbotson

(10) Patent No.: US 7,505,956 B2
(45) Date of Patent: Mar. 17, 2009

(54) METHOD FOR CLASSIFICATION

(75) Inventor: John Bryan Ibbotson, Salisbury (GB)

(73) Assignee: International Business Machines Corporation, Armonk, NY (US)

(*) Notice: Subject to any disclaimer, the term of this patent is extended or adjusted under 35 U.S.C. 154(b) by 833 days.

(21) Appl. No.: 10/150,381

(22) Filed: May 17, 2002

(65) Prior Publication Data

US 2003/0135430 A1    Jul. 17, 2003

(30) Foreign Application Priority Data

Jan. 15, 2002    (GB)    .................................. 0200980.1

(51) Int. Cl.
*G06F 17/30*    (2006.01)
(52) U.S. Cl. ....................... 707/2; 707/3; 707/5; 707/10
(58) Field of Classification Search ................. 707/1–5, 707/7, 8, 10, 100–104.1, 200–203, 205; 705/1, 705/26, 27; 709/200–204, 217–219; 715/500, 715/530
See application file for complete search history.

(56) References Cited

U.S. PATENT DOCUMENTS

| | | | |
|---|---|---|---|
| 6,006,225 A | 12/1999 | Bowman et al. | ................ 707/5 |
| 6,014,638 A | 1/2000 | Burge et al. | .................... 705/27 |
| 6,029,165 A | 2/2000 | Gable | ............................ 707/3 |
| 6,185,558 B1 | 2/2001 | Bowman et al. | ................ 707/5 |
| 6,259,457 B1 * | 7/2001 | Davies et al. | ................ 345/629 |
| 6,266,664 B1 * | 7/2001 | Russell-Falla et al. | ......... 707/5 |
| 6,334,124 B1 * | 12/2001 | Bouchard et al. | .............. 707/3 |
| 6,418,435 B1 * | 7/2002 | Chase | ............................ 707/5 |
| 6,571,239 B1 * | 5/2003 | Cole et al. | ..................... 707/5 |

(Continued)

FOREIGN PATENT DOCUMENTS

WO    95/29451    4/1995

OTHER PUBLICATIONS

Berstis, V.; "Web Page Findability Assessment Tool", International Business Machines Disclosure, AT898-0800 JSL, p. 1-2. (no date).

(Continued)

*Primary Examiner*—Debbie M Le
(74) *Attorney, Agent, or Firm*—Kunzler & McKenzie

(57) ABSTRACT

A method for classification of objects (17) for retrieval from a database (19). The method includes a user (10) classifying an object (30) by designating one or more terms for the object (17). The one or more terms are saved in association with an address for the object (17) in a user index (21). The user index (21) is in a local environment (14) of the user (10). The method also includes promoting the one or more terms for the object (17) from the user index (21) to a global index (22) if the one or more terms meet a predefined set of rules. The global index (22) is accessible by multiple users (10) and may be a search engine index. The objects (17) for retrieval from the database (19) may be web pages or web sites on the Internet. The objects (17) may be in the form of text documents, audio, video, image or any other form of media or a combination of forms of media. The one or more terms may be terms in the object (17) or in an associated description of the object (17).

8 Claims, 3 Drawing Sheets

U.S. PATENT DOCUMENTS

| | | |
|---|---|---|
| 6,584,469 B1 * | 6/2003 | Chiang et al. ............... 707/102 |
| 6,735,583 B1 * | 5/2004 | Bjarnestam et al. ............ 707/2 |
| 6,834,276 B1 * | 12/2004 | Jensen et al. ................... 707/2 |
| 6,856,414 B1 * | 2/2005 | Haneda et al. ........... 707/104.1 |
| 2001/0001854 A1 * | 5/2001 | Schena et al. |
| 2003/0055747 A1 * | 3/2003 | Carr et al. .................... 705/27 |

OTHER PUBLICATIONS

"How to add a site to the Open Directory", dmoz Open Directory Project, Excerpt from: http://dmoz.org/add.html, pp. 2 (Feb. 15, 2002).

* cited by examiner

METHOD FOR CLASSIFICATION

FIELD OF THE INVENTION

This invention relates generally to a method for classification. In particular, the invention relates to promotion of user classification to global search engines. The invention provides a mechanism for dynamically altering the global classification of objects in an information retrieval environment.

BACKGROUND OF THE INVENTION

Information is contained in objects or resources, which are available for access in a database system. The objects or resources may be in the form of documents, web sites, images, video, audio or other forms of media and will have structured or non-structured descriptions associated with them. Database systems from which the objects may be retrieved may be computer networks with data stored across the network on a plurality of connected computer servers. One example of such a network is the Internet.

The Internet has resulted in new challenges for information retrieval due to the extremely high volume of information contained on web sites and web pages forming the World Wide Web. Users can locate information in objects by using the URL (Uniform Resource Locator) of an object such as a web site, which is the address, which specifies the protocol to be used in accessing the object. If a user does not know a URL, a search must be carried out to locate the object or objects of interest to the user. Searches are usually carried out by using keywords derived from authored descriptions of the objects or resources.

Search engines are programs that search for keywords and phrases in the objects themselves or in descriptions of objects. On the Internet, a search engine program may search a single web site or may search across many sites using agents such as spiders to gather lists of available files and documents and store these lists in databases that users can search by keyword. Most search engines reside on a server.

Objects are categorised or formatted at the time of storage in order for the information in the object to be available for search and retrieval. Many search engines and processes rely on authored information to classify objects. The authored information may be provided by the creator of the object or by a dedicated classifier.

A user wishing to access these objects submits a search term to a search engine, which then returns pointers to the objects in the form of links, which allow the objects to be viewed or retrieved.

Automated search engines that rely on keyword matching often return too many low quality matches. The success of the search relies on the user entering search terms, which closely match those already associated with the object and known by the search engine. If the user does not enter the correct terms, then the objects are not identified.

Users of search engines may come from different disciplines such as advertising, technical or marketing disciplines. Users may even be accessing objects for personal use such as objects relating to hobbies. Users will understand vocabularies, which may be different from those used in classifying the objects. The information contained within the objects may still be of interest and relevant to the user but the user has not achieved successful search hits.

Often information may be accessed by serendipity. An object of information may be discovered by luck whilst browsing or a user may have a different understanding of an object's classification.

SUMMARY OF THE INVENTION

According to a first aspect of the present invention there is provided a method for classification of objects for retrieval from a database, the method comprising: a user classifying an object by designating one or more terms for the object; saving the one or more terms in association with an address for the object in a user index, the user index being in a local environment of the user; promoting the one or more terms for the object from the user index to a global index if the one or more terms meet a predefined set of rules, the global index being accessible by multiple users.

The classifying of an object by designating one or more terms for the object may use terms which are different to the terms assigned by the object creator/author.

The global index may be a search engine index.

The predefined set of rules may relate to the use of the one or more terms by a number of different users. The rules may require that a term be used by a given percentage of users before it is promoted to the global index.

The database may be formed of a plurality of servers connected by a network. The objects for retrieval from the database may be web pages or web sites on the Internet. The objects may be in the form of text documents, audio, video, image or any other form of media or a combination of forms of media. The one or more terms may be terms in the object or in an associated description of the object.

The local environment of the user may be a portal to the Internet. Alternatively, the user may register with a global search engine and the local environment of the user may be a partition of a global search engine.

According to a second aspect of the present invention there is provided an apparatus for classification of objects for retrieval from a database, the apparatus comprising:

means for classifying an object by a user by designating one or more terms for the object; a user index in which the one or more terms are stored in association with an address for the object, the user index being in a local environment of the user; promotion means for promoting the one or more terms for the object from the user index to a global index if the one or more terms meet a predefined set of rules, the global index being accessible by multiple users.

The global index of the apparatus may be a search engine index.

The predefined set of rules may relate to the use of the one or more terms by a number of different users. The rules may require that a term is used by a given percentage of users before it is promoted to the global index.

The database may be formed of a plurality of servers connected by a network. The objects for retrieval from the database may be web pages or web sites on the Internet. The objects may be in the form of text documents, audio, video, image or any other form of media or a combination of forms of media. The one or more terms may be terms in the object or in an associated description of the object.

The local environment of the user may be a portal to the Internet. Alternatively, the local environment of the user may be a partition of a global search engine.

According to a third aspect of the present invention there is provided a computer program product stored on a computer readable storage medium, comprising computer readable program code means for performing the steps of: classifying an object by designating one or more terms for the object; saving the one or more terms in association with an address for the object in a user index, the user index being in a local environment of a user; promoting the one or more terms for the object from the user index to a global index if the one or more terms meet a predefined set of rules, the global index being accessible by multiple users.

BRIEF DESCRIPTION OF THE DRAWINGS

Embodiments of the present invention will now be described by way of examples only with reference to the accompanying drawings, in which.

DESCRIPTION OF THE PREFERRED EMBODIMENTS

The invention is applicable to a variety of systems and arrangements, which search and automatically retrieve information. For the purposes of a description of an embodiment of the invention, the context of search and information retrieval from a network such as the Internet is described.

Figure 1:
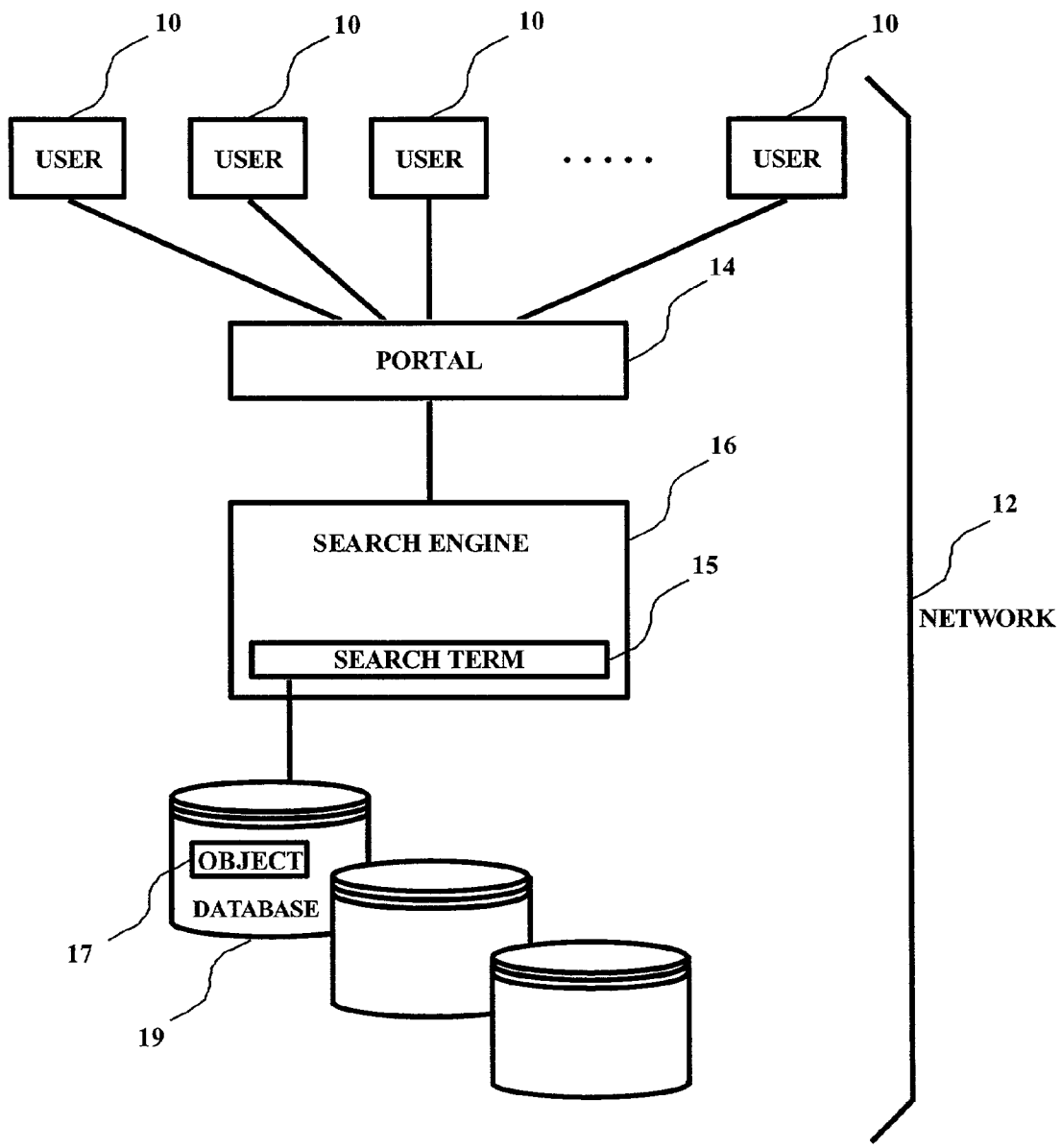
FIG. 1 is a block diagram of an information system for searching and retrieving documents, which can implement the method and apparatus in accordance with a preferred embodiment of the present invention.

Referring to FIG. 1, an information system for searching and retrieving electronic objects is described. A plurality of users 10 access a network 12 by means of user interfaces. In the case of the Internet, the users 10 can be geographically distributed and connection to the network 12 is by means of communication systems.

The users 10 may use a portal 14 as a gateway to the network 12. A portal 14 is a collection of links, content and services to guide users 10 to information they are likely to find interesting. Users 10 can access more then one portal 14 on the network 12.

A portal 14 can include or provide access to a search engine 16, which is a program that searches for keywords (i.e. search terms) 15 in objects stored across the network 12. The portal 14 and the search engine 16 are provided on servers, which are connected to the network 12. The objects 17 to be retrieved may be stored across the network 12 on servers, which are connected by the network 12 to form a global objects database 19. A user 10 can also directly access a search engine 16 without using a portal 14.

Figure 2:
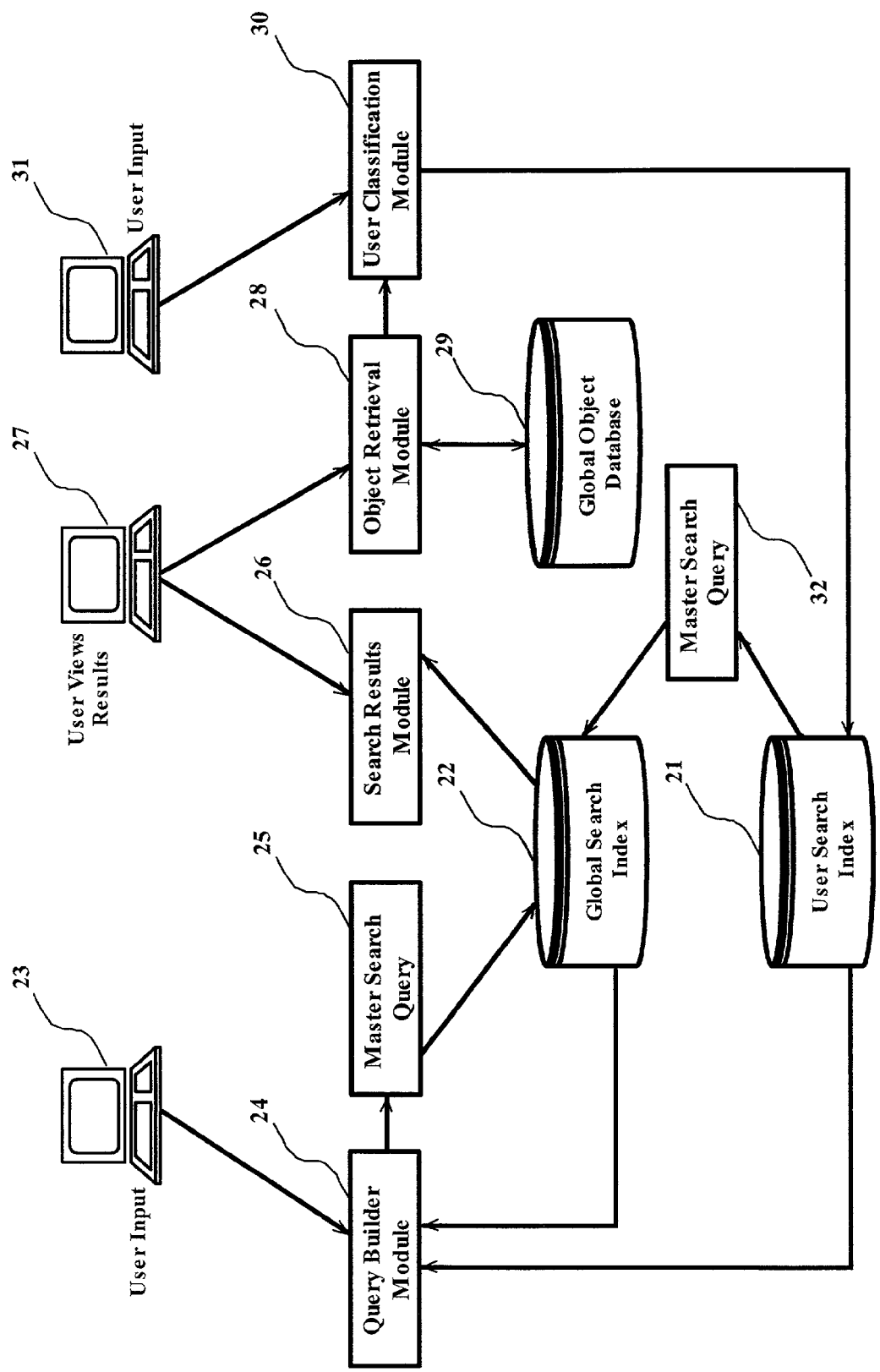
FIG. 2 is a diagram of the method and apparatus in accordance with a preferred embodiment of the present invention.

Referring to FIG. 2, a user search index 21 is provided which consists of a list of search terms assigned by a user 10 of the system. There may exist a user search index 21 for each user of the system and it is under that user's sole control. The user search index 21 can be stored in the portal 14 or a separate server via which the user carries out his searches. Other users of the portal 14 will have user search indexes 21 stored in the portal 14 or in other portals. The portal 14 or separate server may or may not be the same server as the server holding the global search index 22.

Alternatively, users may register with a global search engine and their private user indexes may be stored as part of the global search engine. The global search index 22 may have user partitions to enable storage of individual user search indexes prior to their promotion to the global search index 22. For the purposes of the following description the embodiment of user search indexes 21 stored in a portal 14 is described although it will be appreciated that a range of flexible possibilities of location of the user search indexes is possible.

A global search index 22 includes all the search terms that apply to objects held within the global object database 29. These objects are all retrievable resources and may include audio, image, video, text and any other multimedia object. The contents of the global search index 22 will include a set of terms authored by expert curators with particular knowledge of the objects held within the global object database 29. The global search index 22 is part of a search engine and may be stored on the server, which holds the search engine.

The updating of the global search index 22 by using user search indexes 21 is the subject of this disclosure.

A user interacts with the system as follows. A user of the system provides input via some user input 23 mechanism to a query builder module 24. This module 24 is provided in the portal and allows a user to combine search index terms selected from the global search index 22 and the user's own user search index 21 together with ad hoc terms to create a master search query 25. This query may take the form of a document or procedure call, which is submitted to the global search index 22.

The global search index 22 of the search engine processes the master search query 25 by identifying objects across the global object database 29 that meet the criteria of the master search query 25.

The results of the search are returned to the user and used to construct a search results module 26. The results may take the form of a text abstract or a thumbnail image, which represents the complete object held within the global object database 29. The user is able to view the results of his search on his terminal 27 or user interface. If the user wishes to view the complete object, then an object retrieval module 28 is used to allow a user to retrieve it from the global object database 29.

In most cases, the user will only have used the global search index 22 or ad hoc terms in constructing the original query using the query builder module 24. Having now retrieved the results of his search, including the option of retrieving the entire object, the user has the opportunity to apply his own classification terms to the retrieved object. This is done by providing user input 31 to a user classification module 30. The classification terms applied by the user together with the global reference to the object are then added to the user's user search index 21. In this way the user can apply terms and vocabulary, which he would naturally use to an object, which may be classified using vocabulary from a different discipline.

A user classification promotion module 32 is used to implement a set of rules, which governs the promotion of classification index terms from the individual user search indexes 21 to the global search index 22. The rules for promotion may be flexible. For example, a percentage of users on a given portal classifying an object with the same term, a percentage of all users classifying an object with the same term, etc.

An example rule may be "Promote the User Classification to the Global Index if greater than 50 percent of the users on a given portal classify the same object with the same indexing term". Such a mechanism allows the wishes (as an agreed set of classification indexes) of a community of users to be promoted to a global classification therefore allowing the classification to be available to all users instead of just a subset.

Figure 3:
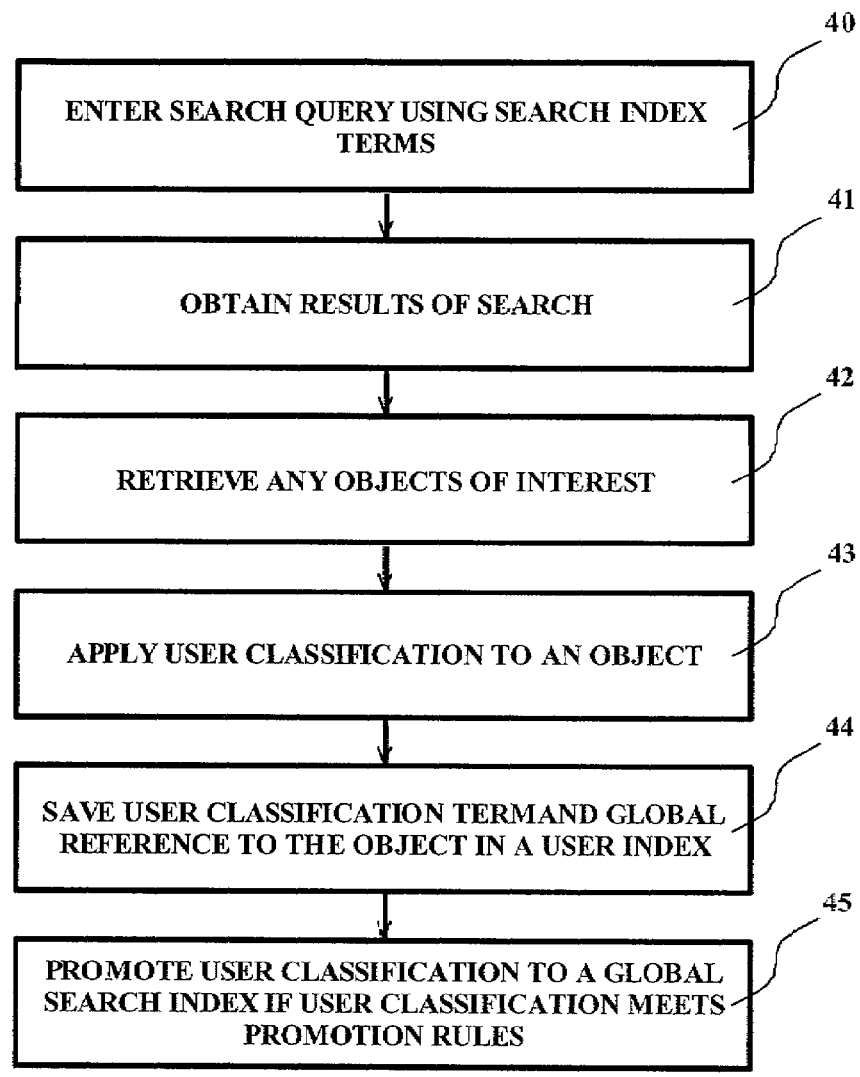
FIG. 3 is a flow diagram of the method in accordance with a preferred embodiment of the present invention.

Referring to FIG. 3, the method of the described embodiment is shown in a flow diagram. In a first step 40, a user enters a search query using search index terms. The search index terms may be made up of a combination of terms from a global search index 22, ad hoc terms and the user's own terms from a user search index 21.

The results of the search are obtained at step 41 and any objects of interest are retrieved at step 42. A user can then apply his own classification to an object at step 43. At step 44, the new user classification is saved together with the global reference to the object in the user search index 21.

If a user classification meets predefined promotion rules, a user classification can be promoted at step 45 from the user search index 21 to a global search index 22 used by other users.

The described method and system provide a mechanism whereby a user can create his own set of search terms for an object within his own local environment. The user's local environment is typically a portal the user uses to connect to information sources. The user's own search terms may then be used to augment a global set of search terms as used by a search engine.

In a portal environment, there may be many users each generating their own sets of terms to classify objects accessed through the portal. Over time, a set of users may develop a consensus on classifying certain objects. The set may be all users accessing objects through the portal or a sub-set of the users. The sub-set could be defined by the discipline of the users such that users from similar disciplines form a sub-set as they are likely to use similar vocabulary for searching for an object.

If the consensus on classifying an object is detected within the portal, then the user specified terms could be promoted from the individual user's classification to the global set of terms used by all users. For example, if a particular URL is classified separately by more than 50% of users of the portal by the same terms then those terms are then promoted to the global search set.

In this way, a global search index is improved through usage by the promotion of search terms to the global search index, which are more effective in locating objects for users from different disciplines using their own vocabularies.

The present invention is typically implemented as a computer program product, comprising a set of program instructions for controlling a computer of similar device. These instructions can be supplied preloaded into a system or recorded on a storage medium such as a CD-ROM, or made available for downloading over a network such as the Internet or a mobile telephone network.

Improvements and modifications may be made to the foregoing without departing from the scope of the present invention.

What is claimed is:

1. A method for classification of objects for retrieval from a database, the method comprising:
    classifying an object by designating one or more terms for the object, the one or more terms being different from previously assigned terms for the object;
    saving the one or more terms in association with an address for the object in a user search index, the user search index being in a local environment of a user, the user search index containing a list of search terms for use by the user in a search query;
    promoting the one or more terms for the object from the user search index to a global search index if the one or more terms meet a predefined set of rules, the global search index being accessible by multiple users, the predefined set of rules being based on a number of different users classifying the object with the one or more terms after retrieval of the object from search query results; and
    combining user search index terms with global search index terms to form a master search query, the master search query operable by the user on a global object database.

2. The method as claimed in claim 1, wherein the global index is a search engine index.

3. The method as claimed in claim 1, wherein the database is formed of a plurality of servers connected by a network.

4. The method as claimed in claim 1, wherein the objects for retrieval from the database are one of web pages and web sites on the Internet.

5. The method as claimed in claim 1, wherein each object comprises at least one media selected from the group of text documents, audio, video, image and any other form of media.

6. The method as claimed in claim 1, wherein the one or more terms are terms in the object or in an associated description of the object.

7. The method as claimed in claim 1, wherein the local environment of the user is a portal to the Internet.

8. The method as claimed in claim 1, wherein the user registers with a global search engine and the local environment of the user is a partition of a global search engine.

* * * * *